United States Patent
Fujiyama

(10) Patent No.: US 12,270,484 B2
(45) Date of Patent: Apr. 8, 2025

(54) VALVE AUTOMATION MECHANISM AND VALVE AUTOMATION METHOD

(71) Applicant: TAKATORI SEISAKUSHO Co., Ltd., Ukiha (JP)

(72) Inventor: Kojiro Fujiyama, Ukiha (JP)

(73) Assignee: TAKATORI SEISAKUSHO Co., Ltd., Ukiha (JP)

( * ) Notice: Subject to any disclaimer, the term of this patent is extended or adjusted under 35 U.S.C. 154(b) by 31 days.

(21) Appl. No.: 17/607,217

(22) PCT Filed: Mar. 31, 2021

(86) PCT No.: PCT/JP2021/013977
§ 371 (c)(1),
(2) Date: Oct. 6, 2022

(87) PCT Pub. No.: WO2022/208788
PCT Pub. Date: Oct. 6, 2022

(65) Prior Publication Data
US 2024/0019041 A1    Jan. 18, 2024

(51) Int. Cl.
*F16K 31/05* (2006.01)
*F16K 1/50* (2006.01)
*F16K 31/04* (2006.01)
*F16K 31/53* (2006.01)

(52) U.S. Cl.
CPC ............. *F16K 31/047* (2013.01); *F16K 1/50* (2013.01); *F16K 31/055* (2013.01); *F16K 31/53* (2013.01)

(58) Field of Classification Search
CPC ........ F16K 31/055; F16K 31/05; F16K 27/02; F16K 31/5352; F16K 31/53; F16K 1/50
See application file for complete search history.

(56) References Cited

U.S. PATENT DOCUMENTS

| 10,088,058 | B2* | 10/2018 | Wattanapan | F16K 31/53 |
| 2008/0315139 | A1* | 12/2008 | Stone | F16K 31/05 |
| | | | | 251/129.03 |
| 2020/0284307 | A1* | 9/2020 | Williams | F16K 37/0041 |

FOREIGN PATENT DOCUMENTS

| JP | 52-008943 U | 8/1978 |
| JP | 53-104427 U1 | 8/1978 |
| JP | 56-119983 U | 2/1983 |
| JP | 58-25874 U1 | 2/1983 |
| JP | 59-63426 U | 11/1985 |
| JP | 60-175969 U1 | 11/1985 |
| JP | 07-208638 A | 8/1995 |

* cited by examiner

*Primary Examiner* — Marina A Tietjen
(74) *Attorney, Agent, or Firm* — Heedong Chae; Lucem, PC

(57) ABSTRACT

A valve automation mechanism that can be easily attached to a large manual valve, can motorize the valve, and is sufficiently downsized so as to be placeable in a narrow installation space is provided. A valve automation mechanism includes a gear attaching mechanism, a support mechanism, a drive mechanism, and a control part. Further, the gear attaching mechanism has a handle rotating gear. Further, the drive mechanism rotates the handle rotating gear and generates a driving force for motorizing the rotation of a handle.

14 Claims, 9 Drawing Sheets

VALVE AUTOMATION MECHANISM AND VALVE AUTOMATION METHOD

TECHNICAL FIELD

The present invention relates to a valve automation mechanism and a valve automation method. Specifically, the present invention relates to a valve automation mechanism that can be easily attached to a large manual valve, can motorize the valve, and is sufficiently small so as to be placeable in a narrow installation space and a valve automation method.

BACKGROUND ART

Conventionally, an automation apparatus having an actuator or the like as a driving source is attached to an existing manual valve installed on piping or the like to motorize the manual valve.

In an automation apparatus for a manual valve for a small diameter valve having a diameter, for example, of less than 100 mm, the size of the automation apparatus is also small and the existing manual valve can be motorized relatively easily.

On the other hand, there is also a need for motorization of a manual valve having a large diameter, and several automation apparatuses have been proposed so far (for example, see Non-Patent Literature 1).

Here, in an automation apparatus described in Non-Patent Literature 1, after removing a handle of a manual valve, which is an object to be attached, the automation apparatus is attached using a dedicated attaching member for attaching an actuator and a support mechanism for supporting the actuator, involving replacement of members on the valve side and dedicated processing.

CITATION LIST

Patent Literature

Non-Patent Literature 1: "Limitorque SMB series, Valve Actuator, Products, Nippon Gear Co., Ltd.", [online], [Search on Mar. 1, 2021], Internet <URL: http://www.nippon-gear.jp/product/valve_actuator/pdf/SMBseries_g004e_s.pdf>

SUMMARY OF INVENTION

Technical Problems

Here, the conventional automation apparatus for motorizing the manual valve having a large diameter including the automation apparatus described in Non-Patent Literature 1 requires a large torque for automatic opening and closing of the valve, so that there is a problem that the sizes of the entire automation apparatus and constituent members increase.

Therefore, when the automation apparatus is attached to an upper portion of the manual valve or its periphery, the size of the entire valve increases as compared to the one before the attachment. In particular, the size of the valve significantly increases in the height direction.

Further, the constituent members of the automation apparatus are large in size and heavy, so that a support structure for supporting them also becomes large and bulky and it is necessary to sufficiently secure a space for installing the automation apparatus.

However, in an environment where a plurality of pipes are densely arranged in a limited narrow space and the distance between the pipes is short, such as the inside of a vessel, there is a problem that, depending on the distance between adjacent pipes, a space sufficient to arrange the automation apparatus for the manual valve cannot be secured.

Further, since the automation apparatus is large in size and heavy, quick installation or removal of the automation apparatus with respect to the manual valve is difficult. Further, with the automation apparatus having no emergency manual handle, the response in removing the automation apparatus and manually operating the valve in an emergency is also difficult.

Furthermore, with the automation apparatus described in Non-Patent Literature 1, a member of the valve that is an object to be attached, such as a valve cover, needs to be replaced with a dedicated attaching member or support mechanism, and a dedicated attaching member or support mechanism needs to be newly manufactured according to the type and shape of the valve. Therefore, a problem arises that the valve cannot be easily motorized and the cost rises remarkably when the number of targeted valves is large.

The present invention has been devised in view of the foregoing points, and an object thereof is to provide a valve automation mechanism that can be easily attached to a large manual valve, can motorize the valve, and is sufficiently downsized so as to be placeable in a narrow installation space and a valve automation method.

Solution to Problems

In order to achieve the foregoing object, a valve automation mechanism of the present invention is one that is attached to a predetermined valve that has a valve box, and a valve rod and a handle attached to the valve box. The automation mechanism controls a flow of a fluid inside the valve box by rotating the handle and moving the handle and the valve rod forward and backward along a longitudinal direction of the valve rod, and is capable of automatically rotating the handle. The valve automation mechanism includes a handle holding portion attached to the handle, a handle rotating gear arranged between the valve box and the handle in the longitudinal direction of the valve rod, attached to the handle holding portion, and rotating integrally with the handle. The automation mechanism further includes a gear supporting portion formed of a substantially tubular body arranged between the valve rod and the handle rotating gear in a direction substantially parallel to a plane defined by the handle (e.g., the rotational plane of the handle). The automation mechanism includes a through hole into which the valve rod is inserted, and, supporting the handle rotating gear, a valve attaching portion that is (1) arranged between the valve box and the handle in the longitudinal direction of the valve rod, (2) connected to the gear supporting portion, and (3) attached to the predetermined valve so that rotation around a position of the valve rod is restricted. Additionally, the automation mechanism includes a drive mechanism (1) arranged between the valve box and the handle in the longitudinal direction of the valve rod, (2) attached to the valve attaching portion, and (3) having a motor and a speed reducer. The valve automation mechanism also includes a drive mechanism gear that is attached to the speed reducer and configured to be rotatable by a driving force of the motor for transmitting power by engagement of the handle rotating gear and the gear.

Here, by the handle holding portion attached to the handle and the handle rotating gear attached to the handle holding portion and rotating integrally with the handle, the handle of the predetermined valve can be rotated together by rotating the handle rotating gear.

The handle rotating gear is arranged between the valve box and the handle in the longitudinal direction of the valve rod, whereby the handle rotating gear can be accommodated in a space between the valve box and the handle of the predetermined valve. This makes it possible to attach the handle rotating gear without changing the overall height of the predetermined valve in the longitudinal direction of the valve rod, that is, the height direction.

Furthermore, the gear supporting portion is formed of a substantially tubular body arranged between the valve rod and the handle rotating gear in a direction substantially parallel to the plane formed by the handle, has a through hole into which the valve rod is inserted, and supports the handle rotating gear, whereby the handle rotating gear can be supported from its inside.

Furthermore, the valve attaching portion is connected to the gear supporting portion and attached to the predetermined valve so that the rotation around the position of the valve rod is restricted, whereby a structure is formed that can support the handle rotating gear without the valve attaching portion and the gear supporting portion rotating around the position of the valve rod.

The valve attaching portion is arranged between the valve box and the handle in the longitudinal direction of the valve rod, whereby the gear supporting portion and the valve attaching portion can be accommodated in the space between the valve box and the handle of the predetermined valve. This makes it possible to attach the gear supporting portion and the valve attaching portion without changing the overall height of the predetermined valve in the longitudinal direction of the valve rod, that is, the height direction.

In addition, by the drive mechanism having the motor and the speed reducer, and the drive mechanism gear attached to the speed reducer, configured to be rotatable by the driving force of the motor, and transmitting power by engagement of the handle rotating gear and the gear, the drive mechanism gear is rotated via the driving force of the motor to transmit this rotation to the handle rotating gear, and the handle rotating gear can be rotated. That is, it becomes possible to rotate the handle of the predetermined valve together with the handle rotating gear, and the predetermined valve can be motorized.

Further, the drive mechanism is arranged between the valve box and the handle in the longitudinal direction of the valve rod, whereby the drive mechanism gear and the drive mechanism can be accommodated in the space between the valve box and the handle of the predetermined valve. This makes it possible to attach the drive mechanism gear and the drive mechanism without changing the overall height of the predetermined valve in the longitudinal direction of the valve rod, that is, the height direction.

Moreover, the valve attaching portion is connected to the gear supporting portion and attached to the predetermined valve so that the rotation around the position of the valve rod is restricted, and the drive mechanism is attached to the valve attaching portion, whereby it becomes possible to rotate the handle of the predetermined valve via the drive mechanism gear without the drive mechanism and the drive mechanism gear rotating around the position of the valve rod. That is, for example, when the drive mechanism and the drive mechanism gear rotate around the position of the valve rod, the drive mechanism and the drive mechanism gear move along the outer circumference of the handle rotating gear, and the engagement of the drive mechanism gear and the handle rotating gear is misaligned, and the handle of the predetermined valve cannot be rotated. However, by restricting the rotation of the drive mechanism and the drive mechanism gear, the engagement of the drive mechanism gear and the handle rotating gear can be prevented from being misaligned, and the handle of the predetermined valve can be rotated stably.

When the handle holding portion, the handle rotating gear, the gear supporting portion, the valve attaching portion, and the drive mechanism gear are arranged within a range of an outer edge portion of the handle in a direction substantially parallel to the plane formed by the handle, the handle holding portion, the handle rotating gear, the gear supporting portion, the valve attaching portion, and the drive mechanism gear can be accommodated further inward than the predetermined valve in a direction substantially parallel to the plane defined by the handle, that is, the width direction (i.e., when viewed from a direction perpendicular to the plane defined by the handle, these components are located within a boundary defined by the outer edge of to handle). This makes it possible to prevent the size from increasing in the width direction with the valve automation mechanism attached.

Further, when the predetermined valve has a rib portion provided to the valve box in a manner so as to project toward a direction of the handle, fitted to the valve rod by a thread groove structure, and supporting rotation of the valve rod and forward and backward movement of the valve rod along the longitudinal direction thereof, and the valve attaching portion is configured to be able to move forward and backward along the rib portion along with forward and backward movement of the handle and the valve rod along the longitudinal direction of the valve rod, the engagement of the drive mechanism gear and the handle rotating gear can be prevented from being misaligned in the height direction, and the handle of the predetermined valve can be rotated stably. That is, the valve attaching portion is moved according to the height position of the handle rotating gear that changes by the handle and the valve rod of the predetermined valve moving forward and backward along the longitudinal direction of the valve rod, thereby allowing the height position of the drive mechanism gear to be aligned.

In addition, the predetermined valve has the rib portion provided to the valve box in a manner so as to project toward the direction of the handle, and the valve attaching portion is attached to the rib portion so as to sandwich the rib portion, whereby the valve attaching portion can be stably attached to the predetermined valve with a simple structure in which the rib portion is only fitted so as to be sandwiched by the valve attaching portion. Further, with this simple structure, the rotation of the valve attaching portion around the position of the valve rod can be restricted.

When the valve attaching portion has a wear preventing mechanism configured to be rotatable, on at least a part of a surface opposed to the rib portion, the wear preventing mechanism can rotate between the two members to smooth the movement of the valve attaching portion and prevent the valve attaching portion from being worn, when the valve attaching portion moves forward and backward along the rib portion.

Further, when the valve attaching portion is arranged with a wear preventing member for preventing wear between the valve attaching portion and the rib portion, on at least a part of the surface opposed to the rib portion, the valve attaching portion can be prevented from being worn due to the existence of the wear preventing member between the two members when the valve attaching portion moves forward and backward along the rib portion.

Additionally, when the handle rotating gear and the drive mechanism gear are arranged in an orientation substantially parallel to the plane formed by the handle, the volume occupied by the handle rotating gear and the drive mechanism gear becomes small in the height direction, and the size can be prevented from increasing in the height direction with the valve automation mechanism attached.

Further, when a bearing portion attached between the gear supporting portion and the handle rotating gear to smooth rotation of the handle rotating gear is provided, the wear of the gear supporting portion due to the rotation of the handle rotating gear can be prevented, and the handle rotating gear can be rotated smoothly, and the power required for the rotation can be reduced.

Also, when the bearing portion is composed of a crossed roller bearing, it becomes a bearing portion in which roller bearings having different axial directions are attached in two directions. Even when a force is applied from both the horizontal direction and the vertical direction, the bearing portion can smoothly rotate the handle rotating gear without being distorted or decentered.

Further, when an outer circumferential diameter and the number of gear teeth of the handle rotating gear can be changed according to the size of an outer circumferential diameter of the handle, the handle rotating gear having the outer circumferential diameter and the number of gear teeth matching the outer circumferential diameter of the handle of the predetermined valve can be selected to obtain a maximum torque sufficient for automatically opening and closing the predetermined valve while using the same drive mechanism, even if the size of the outer circumferential diameter of the handle of the predetermined valve is different. That is, as the diameter of the valve increases, the outer circumferential diameter of the handle also increases. Therefore, the automation mechanism can be attached to valves having different diameters only by changing the handle rotating gear.

Furthermore, when the predetermined valve is an existing manual valve in which a handle is rotated manually, and the handle holding portion, the handle rotating gear, the gear supporting portion, the valve attaching portion, the drive mechanism, and the drive mechanism gear can be retrofitted to the existing manual valve, the existing manual valve can be motorized easily. Further, the automation mechanism can be removed and returned to its original state according to need.

In another embodiment, in order to achieve the foregoing object, a valve automation method of the present invention is one for automatically rotating a handle of a predetermined valve that has a valve box, and a valve rod and the handle attached to the valve box for controlling a flow of a fluid inside the valve box by rotating the handle and moving forward and backward the handle and the valve rod along a longitudinal direction of the valve rod. The method includes an attaching step of attaching, between the valve box and the handle in the longitudinal direction of the valve rod, (1) a handle rotating gear rotating integrally with the handle, (2) a gear supporting portion for supporting the handle rotating gear, (3) a valve attaching portion connected to the gear supporting portion, attached to the predetermined valve, and restricted in rotation around a position of the valve rod, (4) a drive mechanism attached to the valve attaching portion and having a motor and a speed reducer, and (5) a drive mechanism gear rotated by a driving force of the motor for transmitting power by engagement of the handle rotating gear and the gear. The method includes a handle rotating step of driving the motor, rotating the drive mechanism gear, and rotating the handle.

Here, by attaching the handle rotating gear rotating integrally with the handle in the attaching step, the handle of the predetermined valve can be rotated together by rotating the handle rotating gear.

Furthermore, by attaching the gear supporting portion for supporting the handle rotating gear in the attaching step, the handle rotating gear can be supported by the gear supporting portion.

In addition, by attaching the valve attaching portion connected to the gear supporting portion, attached to the predetermined valve, and restricted in rotation around the position of the valve rod in the attaching step, a structure is formed that can support the handle rotating gear without the valve attaching portion and the gear supporting portion rotating.

Furthermore, by attaching the drive mechanism having the motor and the speed reducer and the drive mechanism gear rotated by the driving force of the motor and transmitting power by engagement of the handle rotating gear and the gear in the attaching step, the drive mechanism gear is rotated via the driving force of the motor to transmit this rotation to the handle rotating gear, and the handle rotating gear can be rotated.

Furthermore, by attaching the handle rotating gear, the gear supporting portion, the valve attaching portion, the drive mechanism having the motor and the speed reducer, and the drive mechanism gear between the valve box and the handle in the longitudinal direction of the valve rod in the attaching step, each member can be accommodated in a space between the valve box and the handle of the predetermined valve. This makes it possible to attach each member without changing the overall height of the predetermined valve in the longitudinal direction of the valve rod, that is, the height direction.

Further, by driving the motor, rotating the drive mechanism gear, and rotating the handle in the handle rotating step, the rotation of the handle and the valve rod can be motorized to control the flow of the fluid flowing inside the valve box.

Additionally, by attaching the gear supporting portion, the valve attaching portion connected to the gear supporting portion, attached to the predetermined valve, and restricted in rotation around the position of the valve rod, the drive mechanism attached to the valve attaching portion, and the drive mechanism gear in the attaching step, the handle of the predetermined valve can be rotated via the drive mechanism gear without the drive mechanism and the drive mechanism gear rotating. That is, for example, when the drive mechanism and the drive mechanism gear rotate around the position of the valve rod, the drive mechanism and the drive mechanism gear move along the outer circumference of the handle rotating gear, so that the engagement of the drive mechanism gear and the handle rotating gear is misaligned, and the handle of the predetermined valve cannot be rotated. However, by restricting the rotation of the drive mechanism and the drive mechanism gear, the engagement of the drive mechanism gear and the handle rotating gear can be prevented from being misaligned, and the handle of the predetermined valve can be rotated stably.

Further, when the handle rotating gear, the gear supporting portion, the valve attaching portion, and the drive mechanism gear are attached within a range of an outer edge portion of the handle in a direction substantially parallel to a plane formed by the handle in the attaching step, a handle holding portion, the handle rotating gear, the gear supporting portion, the valve attaching portion, and the drive mechanism gear can be accommodated further inward than the predetermined valve in a direction substantially parallel to the plane formed by the handle, that is, the width direction. This makes it possible to prevent the size from increasing in the width direction with the valve automation mechanism attached.

Further, when the predetermined valve has a rib portion provided to the valve box in a manner so as to project toward a direction of the handle, fitted to the valve rod by a thread groove structure, and supporting rotation of the valve rod and forward and backward movement of the valve rod along the longitudinal direction thereof, and the attaching step attaches the valve attaching portion to the rib portion so as to sandwich the rib portion, and the handle rotating step moves forward and backward the valve attaching portion along the rib portion along with forward and backward movement of the handle and the valve rod along the longitudinal direction of the valve rod, the engagement of the drive mechanism gear and the handle rotating gear can be prevented from being misaligned in the longitudinal direction of the valve rod, that is, the height direction, and the handle of the predetermined valve can be rotated stably. That is, the valve attaching portion is moved according to the height position of the handle rotating gear that changes by the handle and the valve rod of the predetermined valve moving forward and backward along the longitudinal direction of the valve rod, thereby allowing the height position of the drive mechanism gear to be aligned.

In another embodiment, in order to achieve the foregoing object, the valve automation mechanism of the present invention is one that is attached to a predetermined valve that has a valve box, and a valve rod and a handle attached to the valve box for controlling a flow of a fluid inside the valve box by rotating the handle and moving forward and backward the handle and the valve rod along a longitudinal direction of the valve rod, and is capable of automatically rotating the handle, the valve automation mechanism including a handle rotating gear arranged between the valve box and the handle in the longitudinal direction of the valve rod and rotating integrally with the handle, a holding mechanism arranged between the valve box and the handle in the longitudinal direction of the valve rod, supporting the handle rotating gear, attached to the predetermined valve, and restricted in rotation around a position of the valve rod, and a gear drive mechanism arranged between the valve box and the handle in the longitudinal direction of the valve rod, attached to the holding mechanism, rotated based on a driving force of a motor, and transmitting power by engagement of the handle rotating gear and the gear.

Here, the gear drive mechanism is rotated based on the driving force of the motor and transmits power by engagement of the handle rotating gear and the gear, whereby the driving force of the motor is transmitted from the gear drive mechanism to the handle rotating gear, and the handle rotating gear can be rotated. That is, it becomes possible to rotate the handle of the predetermined valve together with the handle rotating gear, and the predetermined valve can be motorized.

Further, the holding mechanism supports the handle rotating gear, is attached to the predetermined valve, and is restricted in rotation around the position of the valve rod, and the gear drive mechanism is attached to the holding mechanism, thereby making it possible to rotate the handle of the predetermined valve via the gear drive mechanism without the holding mechanism and the gear drive mechanism rotating. That is, for example, when the gear drive mechanism rotates around the position of the valve rod, the gear drive mechanism moves along the outer circumference of the handle rotating gear, and the engagement of the gear drive mechanism and the handle rotating gear is misaligned, and the handle of the predetermined valve cannot be rotated. However, by restricting the rotation of the gear drive mechanism, the engagement of the gear drive mechanism and the handle rotating gear can be prevented from being misaligned, and the handle of the predetermined valve can be rotated stably.

Further, the handle rotating gear, the holding mechanism, and the gear drive mechanism are arranged between the valve box and the handle in the longitudinal direction of the valve rod, whereby each member can be accommodated in the space between the valve box and the handle of the predetermined valve. This makes it possible to attach each member without changing the overall height of the predetermined valve in the longitudinal direction of the valve rod, that is, the height direction.

Advantageous Effects of Invention

The valve automation mechanism according to the present invention can be easily attached to a large manual valve, can motorize the valve, and is sufficiently downsized so as to be placeable in a narrow installation space.

Further, the valve automation method according to the present invention is a method capable of providing a valve automation mechanism that can be easily attached to a large manual valve, can motorize the valve, and is sufficiently downsized so as to be placeable in a narrow installation space.

BRIEF DESCRIPTION OF DRAWINGS

FIG. 7A is a schematic perspective view showing a state before the rib attaching portion rises, and FIG. 7B is a schematic perspective view showing a state where the rib attaching portion is rising.

DESCRIPTION OF EMBODIMENTS

Hereinafter, embodiments of the present invention will be described to provide an understanding of the present invention.

A valve automation mechanism 1, which is an example of the valve automation mechanism to which the present invention is applied, is a mechanism for motorizing the rotation of a handle 101 that controls a fluid flowing inside a manual valve 100 (see FIGS. 1A, 1B, 2A, and 2B). It is noted that the content described below is an example of the valve automation mechanism to which the present invention is applied, and the subject matter of the present invention is not limited thereto and the settings can be changed as appropriate.

Figure 2A:
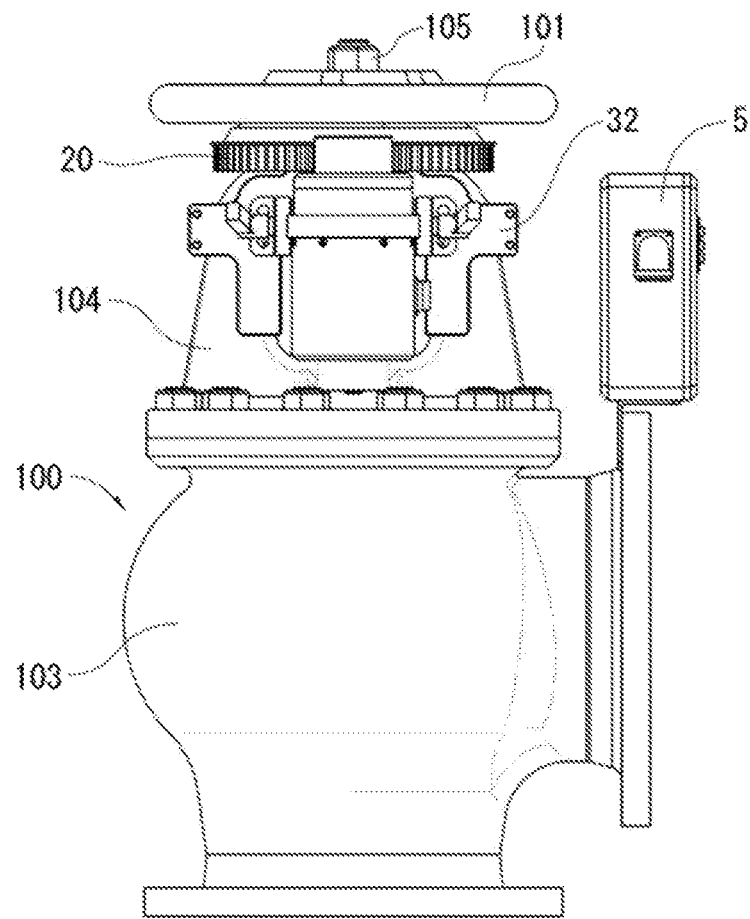
FIG. 2A is a schematic front view of the valve shown in FIGS. 1A and 1B.
Figure 2B:
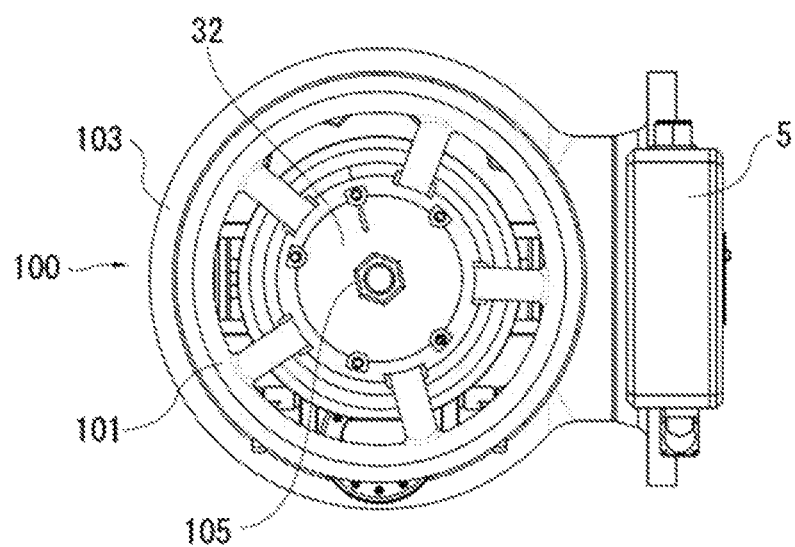
FIG. 2B is a schematic plan view of the valve shown in FIGS. 1A and 1B.

Further, in the following description, for convenience of explanation, the up-down direction in the figure shall be referred to as an "up-down direction" or "vertical direction" and the left-right direction in the figure shall be referred to as a "horizontal direction" on the basis of FIG. 2A.

Further, the valve 100 is a globe valve including the handle 101, a valve rod 102, a valve box 103, and a rib 104 (see FIGS. 1A, 1B, 2A, 2B, 3A, 3B, 6A, 6B, 7A, 7B, and 9.). Further, the valve 100 is a large valve, e.g., having a diameter of 200 mm.

Further, the handle 101 is detachably attached to the valve rod 102 and is a part manually rotated by the operator in a state of being attached to the valve rod 102.

Further, the valve rod 102 is connected to a valve body (not shown), and, by manually rotating the handle 101, the valve rod 102 rotates with the handle 101, and by the valve body opening and closing the flow path of the fluid flowing inside the valve box 103, the flow of the fluid is controlled.

Further, the rib 104 is provided on an upper portion of the valve box 103 and is fitted with the valve rod 102 by a thread groove structure. The rib 104 is a member that guides, via the thread groove structure, the movement of the valve rod 102 moving forward and backward in the up-down direction while rotating.

Since the structure of the valve 100 is a known globe valve structure, its detailed description will be omitted. Further, the rib 104 here is a member corresponding to a rib portion in the claims of the present application.

Here, the type of valve to which the valve automation mechanism according to the present invention is attached is not limited to a globe valve, and any valve can be applied as long as it has a handle and a valve rod and controls the flow of a fluid by their rotation. The valve automation mechanism to which the present invention is applied can be adopted for a known type of valve such as a ball valve, a gate valve, or a butterfly valve. More specifically, the structure of the present invention can be applied as it is to a multi-turn type valve such as a gate valve, which requires one or more rotations to open and close the valve. Further, for a part-turn valve such as a ball valve or a butterfly valve, which is opened and closed by a 90-degree rotation of the handle, the valve automation mechanism to which the present invention is applied can be adopted by changing an attachment structure to the handle or the like.

Further, the diameter of the valve to which the valve automation mechanism according to the present invention is attached is not limited to the size of 200 mm. For example, for the globe valve, the present invention can be applied also to a valve having a diameter of 100 mm or more. Furthermore, the present invention can be applied also to a valve having a diameter of more than 200 mm.

[Overall Structure of Valve Automation Mechanism]

Figure 1A:
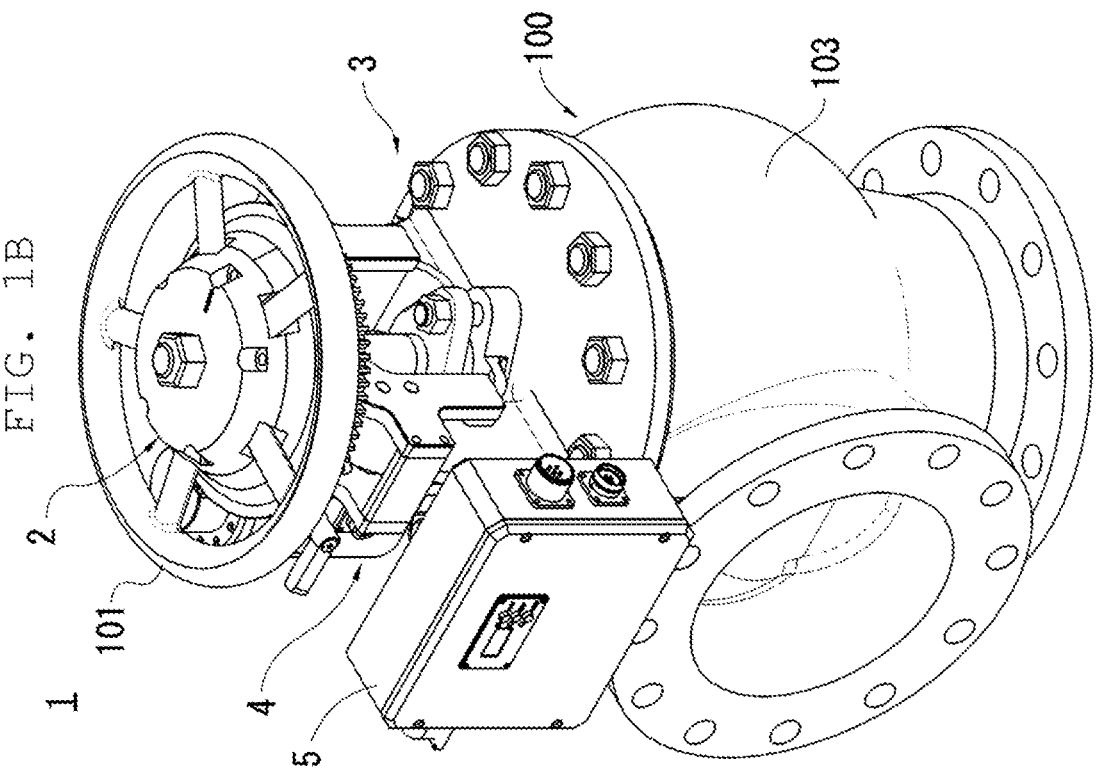
FIG. 1A and FIG. 1B are schematic perspective views showing a valve to which a valve automation mechanism, which is an example of a valve automation mechanism according to the present invention, is attached.
Figure 1B:
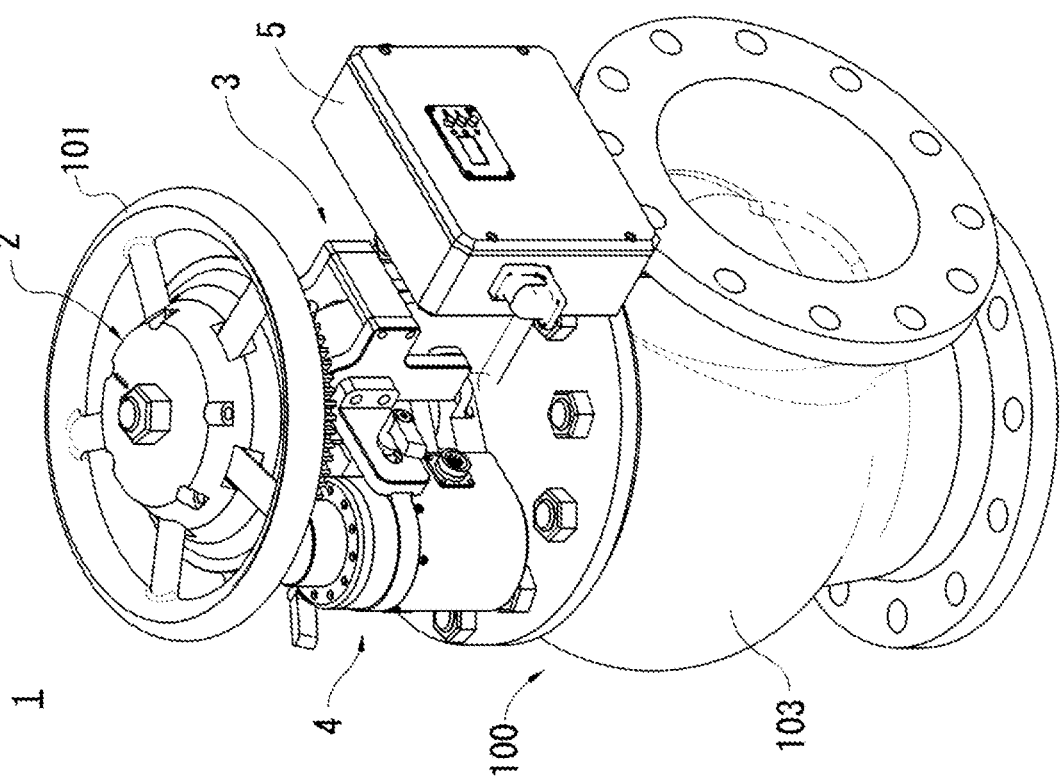

As shown in FIGS. 1A and 1B, the valve automation mechanism 1 includes a gear attaching mechanism 2, a support mechanism 3, a drive mechanism 4, and a control part 5.

Further, the gear attaching mechanism 2 is an attaching mechanism for attaching, to the handle 101 of the valve 100, a handle rotating gear 20 rotating integrally with the handle 101 (see FIGS. 2A, 2B, 3A, and 3B).

Further, the support mechanism 3 is an attaching mechanism for attaching the gear attaching mechanism 2 and the drive mechanism 4 to the valve 100 and is also a member for supporting the gear attaching mechanism 2.

Further, the drive mechanism 4 is a mechanism that rotates the handle rotating gear 20 and generates a driving force for motorizing the rotation of the handle 101. The details of each mechanism will be described later.

Further, the control part 5 includes a communication function with the outside and is a part that controls the drive of a motor constituting the drive mechanism 4 by a control signal transmitted from an external terminal or the like. The motor is configured so that the rotation direction and the rotation speed can be controlled via the control part 5.

Further, the control part 5 has a power button (illustration omitted) capable of switching on and off of the power supply. Furthermore, the control part 5 has a function of converting alternate current and direct current power supplies.

[Gear Attaching Mechanism]

Figure 3A:
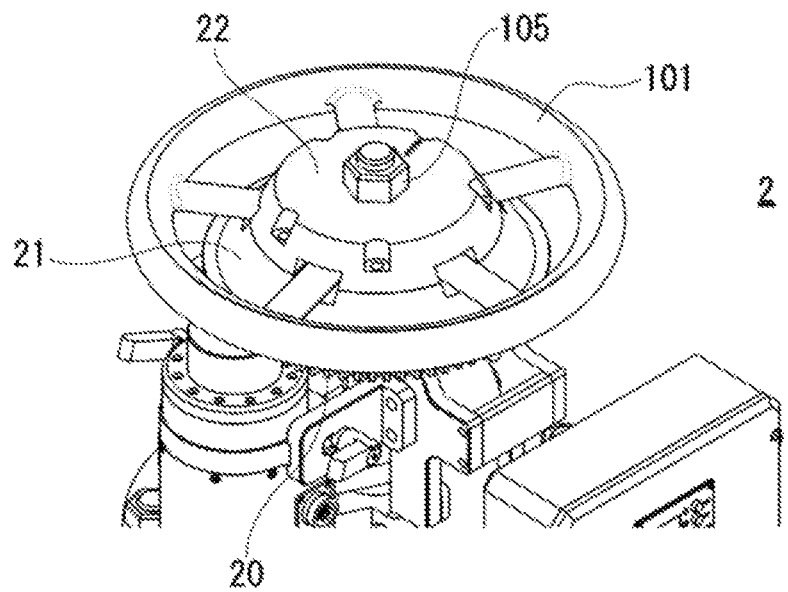
FIG. 3A is a schematic perspective view showing a handle and a gear attaching mechanism and their peripheral structure.
Figure 3B:
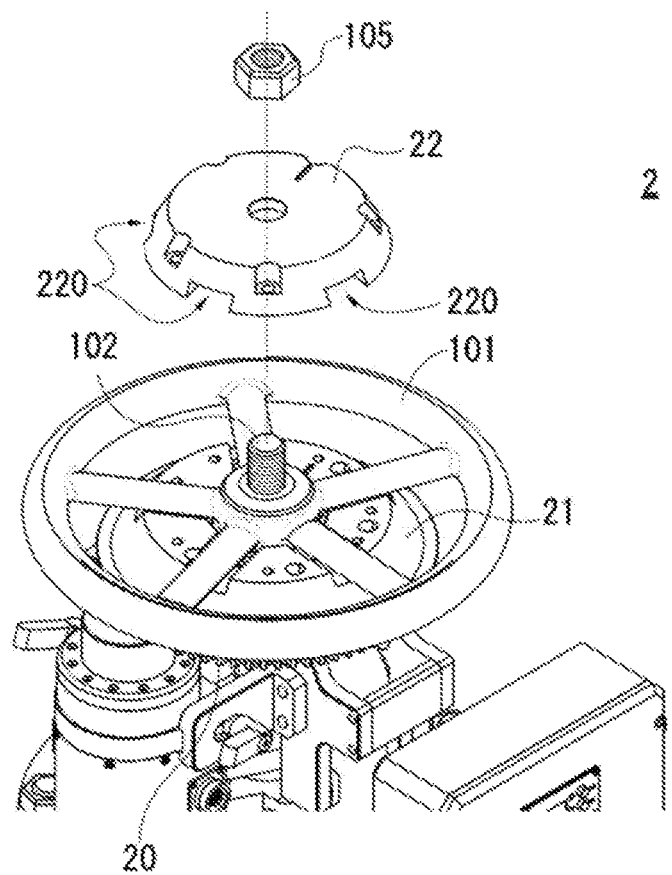
FIG. 3B is an exploded perspective view showing a state in which a case lid portion and a fixing nut are removed from the structure shown in FIG. 3A.

As shown in FIGS. 3A and 3B, the gear attaching mechanism 2 has the handle rotating gear 20, a handle holding case 21, a case lid portion 22, and a fixing nut 105.

Further, the handle rotating gear 20 is a member that is integrated with the handle 101 via the handle holding case 21, the case lid portion 22, and the fixing nut 105 and is a member that engages the gear of a drive part side gear 41 described later and rotates together with the handle 101 (see FIG. 4B).

Figure 4A:
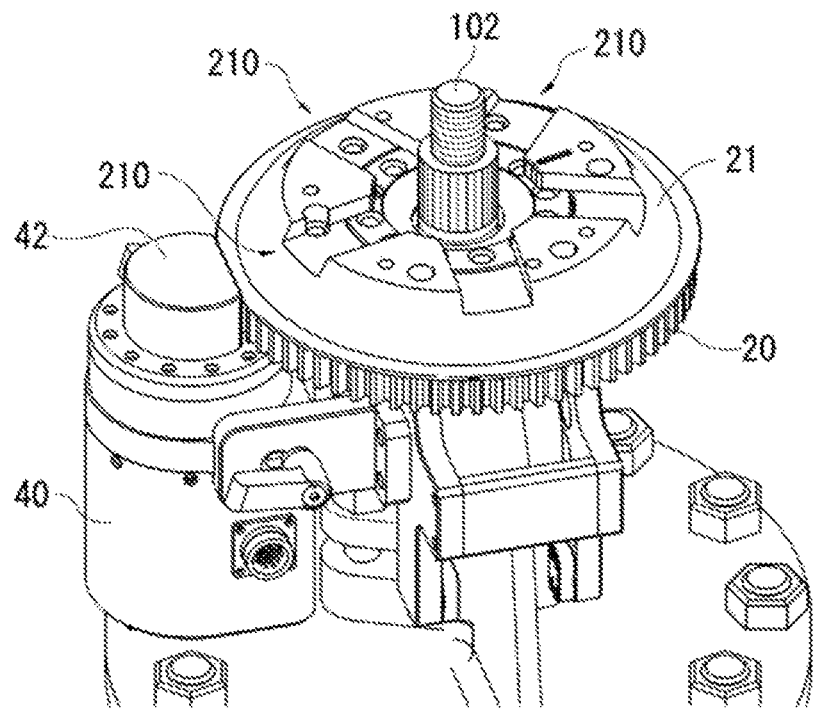
FIG. 4A is a schematic perspective view showing a handle holding case and a handle rotating gear and their peripheral structure.
Figure 4B:
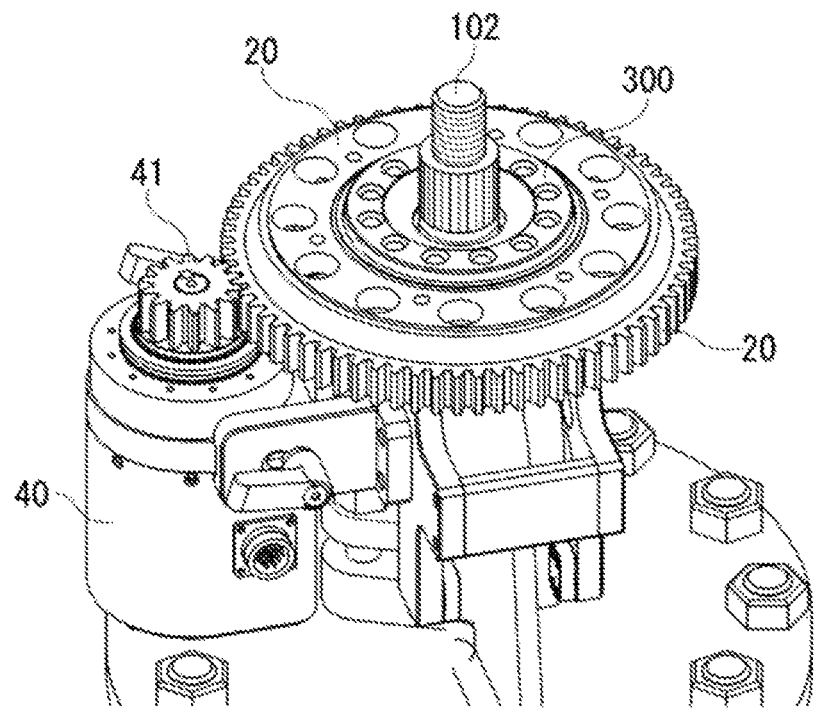
FIG. 4B is a schematic perspective view showing the handle rotating gear and a gear supporting portion and their peripheral structure.

Further, the handle rotating gear 20 is a substantially doughnut-shaped member in which a through hole into which the valve rod 102 can be inserted is formed in the center of the handle rotating gear 20 (see FIG. 4B).

As just described, due to the structure in which the valve rod 102 is inserted in the center of the handle rotating gear 20, the position of the valve rod 102, which is the rotation axis of the handle 101, becomes the center position of rotation in the handle rotating gear 20.

That is, a structure is formed in which the center positions of rotation of the handle 101 and the handle rotating gear 20 are aligned in the horizontal direction.

This makes it possible to stably rotate the handle 101 at the time of rotating the handle 101 integrally with the handle rotating gear 20. Further, the loss of the driving force generated from the motor can be reduced to efficiently rotate the handle 101.

Further, on an outer circumferential surface of the handle rotating gear 20, teeth the number of which is formed in accordance with the size of the outer circumferential diameter of the handle 101 are formed. Further, the size of the outer circumferential diameter of the handle rotating gear 20 is formed in accordance with the size of the outer circumferential diameter of the handle 101. The relationship between the number of gear teeth and the size of the outer circumferential diameter will be described later.

Further, the handle holding case 21 is a fixing member for sandwiching and fixing the handle 101 between the handle holding case 21 and the case lid portion 22 and is also a cover member for protecting an upper portion of the handle rotating gear 20 (see FIG. 4A).

Further, the handle holding case 21 is a substantially doughnut-shaped member in which a through hole into which the valve rod 102 can be inserted is formed in the center of the handle holding case 21, and the handle rotating gear 20 is attached to a lower portion side of the handle holding case 21, and a structure is formed in which the handle holding case 21 and the handle rotating gear 20 are integrated (see FIG. 4A).

In FIG. 4B, in order to clarify the shape of the handle rotating gear 20, the handle rotating gear 20 is shown in a state separated from the handle holding case 21.

Further, a plurality of groove portions 210 for fitting spokes of the handle 101 are formed on an upper portion side of the handle holding case 21 (see FIG. 4A). Further, a plurality of groove portions 220 for fitting the spokes of the handle 101 are formed also on a lower portion side of the case lid portion 22 (see FIG. 3B).

Further, the case lid portion 22 is formed with a through hole in the center thereof into which the valve rod 102 can be inserted (see FIG. 3B). Further, the fixing nut 105 is a member that is fitted to a groove (reference sign omitted) formed on an outer circumferential surface of an upper portion of the valve rod 102 by a thread groove structure and fixes the case lid portion 22, the handle holding case 21, and the handle rotating gear 20.

For the fixing nut 105, a member for fixing the handle 101 to the valve rod 102 in the valve 100 can be adopted as it is.

Due to such a structure of the gear attaching mechanism 2, as shown in FIGS. 3A and 3B, the fixing nut 105 is tightened with the handle 101 sandwiched between the handle holding case 21 and the case lid portion 22, and the handle 101, the case lid portion 22, the handle holding case 21, and the handle rotating gear 20 can be integrated to fix the state.

Further, since the handle holding case 21 and the handle rotating gear 20 are integrated, the handle rotating gear 20 can be attached to a lower portion of the handle 101.

Further, by attaching the handle rotating gear 20 to the lower portion of the handle 101, the overall size of the valve can be prevented from increasing. Further, the handle 101 can be made easier to operate manually in an emergency or the like.

As described above, the handle rotating gear 20 can be easily attached to the lower portion of the handle 101 of the valve 100 via the gear attaching mechanism 2.

[Support Mechanism]

Figure 5A:
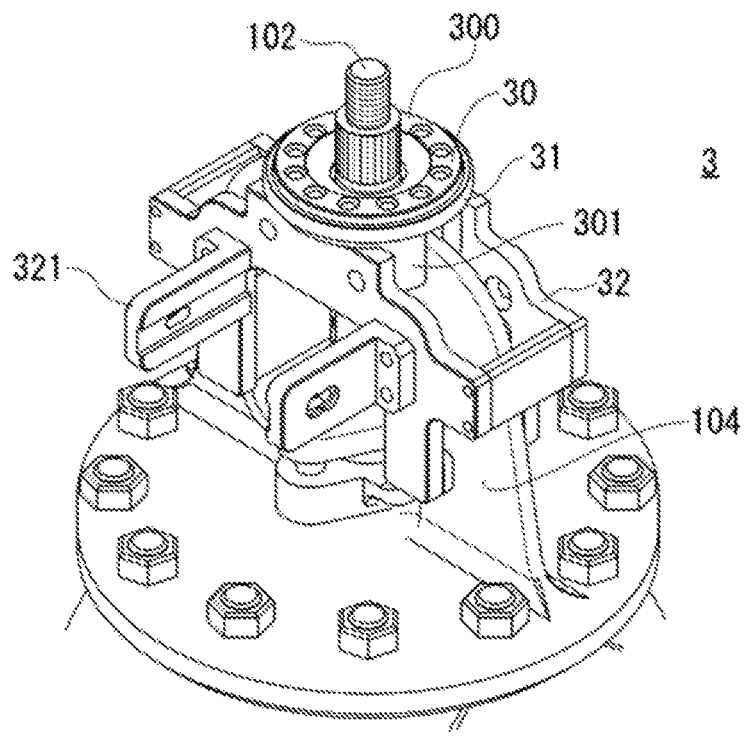
FIG. 5A is a schematic perspective view showing a structure in a state where a support mechanism is attached to a rib.

As shown in FIG. 5A, the support mechanism 3 has a gear supporting portion 30, a bearing portion 31, and a rib attaching portion 32. In FIGS. 5A, 5B, 6A, and 6B, in order to clarify the shape and the arrangement position of each constituent member of the support mechanism 3, the figure is shown by omitting each member of the gear attaching mechanism 2.

Further, the gear supporting portion 30 is a member that supports the handle rotating gear 20. The gear supporting portion 30 is a member that is itself fixed to the rib attaching portion 32 with a bolt (illustration omitted) so as not to rotate and that rotatably and axially supports the handle rotating gear 20.

Further, the bearing portion 31 is a member that is attached between the gear supporting portion 30 and the handle rotating gear 20 (see FIG. 5B) and is a member for smoothly rotating the handle rotating gear 20. Further, the bearing portion 31 is a member that prevents the gear supporting portion 30 from being worn due to the rotation of the handle rotating gear 20. Further, the bearing portion 31 has its inner side sandwiched between an upper support portion 300 and a lower support portion 301 and has its outer side sandwiched between the handle holding case 21 and the handle rotating gear 20, and the bearing portion 31 is held by the pressure sandwiched by each member.

Further, the bearing portion 31 is composed of a crossed roller bearing, and roller bearings having different axial directions are attached in two directions. Therefore, even when a force is applied from both the horizontal direction and the vertical direction, the bearing portion 31 can smoothly rotate the handle rotating gear 20 without being distorted or decentered.

Further, the rib attaching portion 32 is a member for attaching the gear supporting portion 30 to the rib 104 of the valve 100. More specifically, the rib attaching portion 32 is a member for attaching the gear attaching mechanism 2 and the drive mechanism 4 to the valve 100 and is also a member that supports the gear attaching mechanism 2.

Figure 5B:
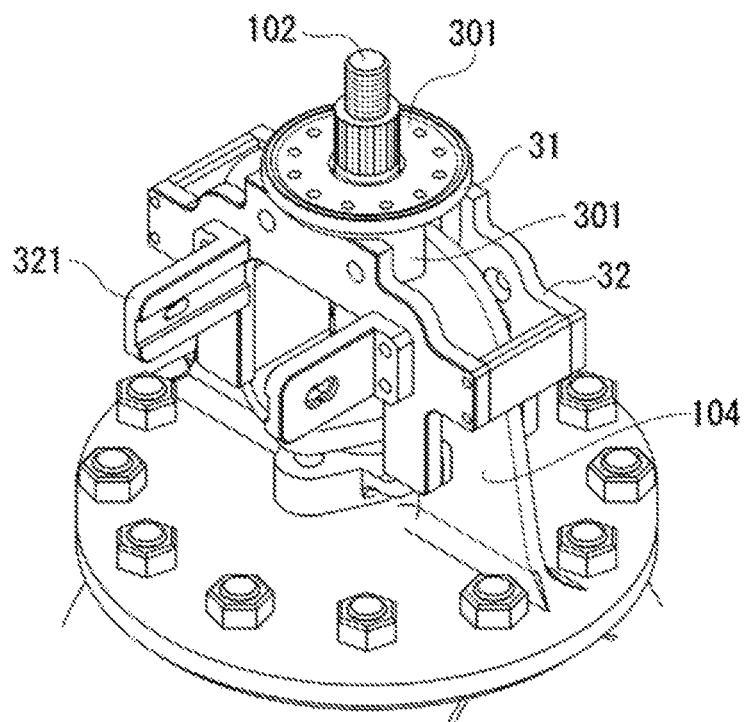
FIG. 5B is a schematic perspective view showing a lower support portion and a rib attaching portion in the support mechanism and their peripheral structure.
Figure 9:
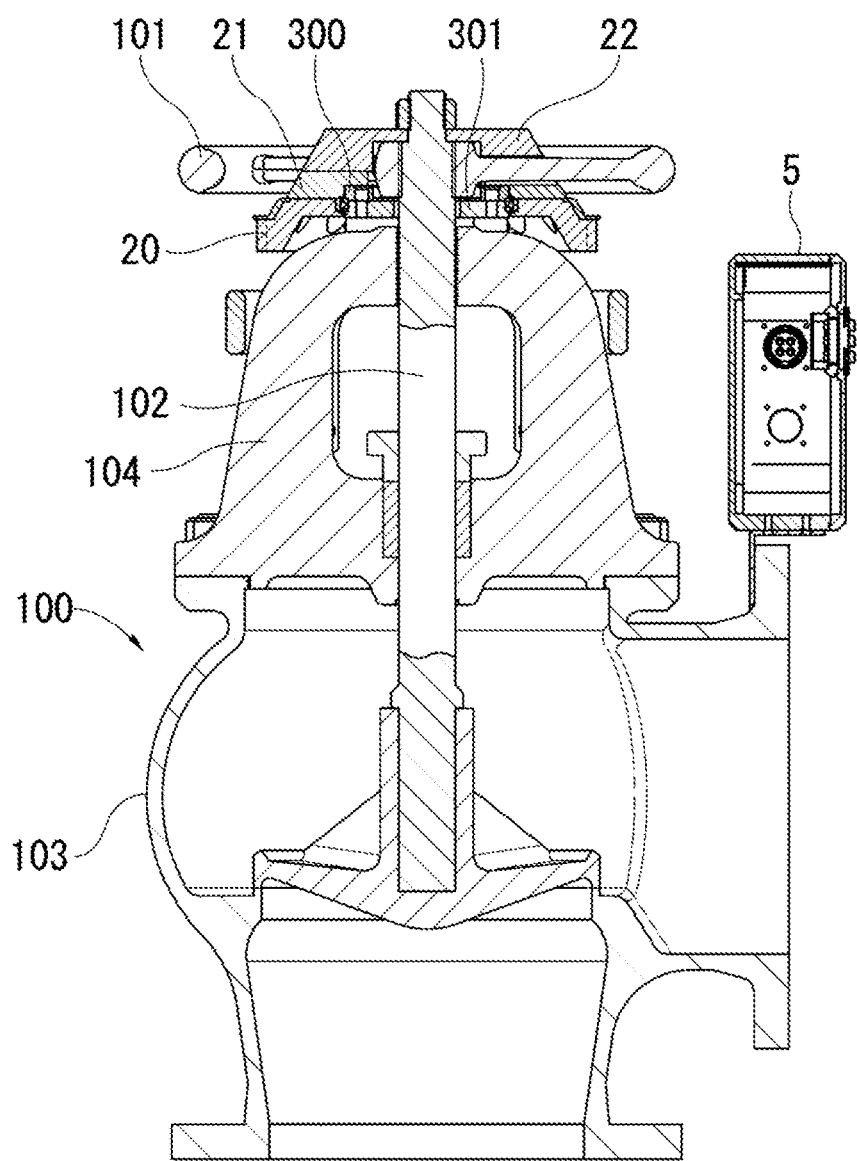
FIG. 9 is a schematic cross-sectional view showing a cross section taken along the diameter direction of the handle and in the center of the rib in the structure of the valve shown in FIG. 1.

Further, the gear supporting portion 30 is composed of a member in which two members, the upper support portion 300 and the lower support portion 301, are fixed in the up-down direction with a bolt and integrated (see FIGS. 5A, 5B, and 9).

Further, the lower support portion 301 has a part of its outer circumferential surface fixed to the rib attaching portion 32 with a bolt (illustration omitted) to constitute a basic part of the gear supporting portion 30. Further, the lower support portion 301 has a shape in which a fitting groove 302 is formed in the center side of a lower portion thereof, into which a part of an upper end of the rib 104 can be fitted (see FIG. 6A).

Further, the lower support portion 301 is formed with a through hole in the center thereof into which the valve rod 102 can be inserted (see FIG. 5B). Further, the lower support portion 301 is formed with a stepped portion for attaching the bearing portion 31, on an outer circumferential surface of an upper portion side of the lower support portion 301. Further, the upper support portion 300 sandwiches the bearing portion 31 with the lower support portion 301.

Further, the upper support portion 300 is fitted to an inner circumferential surface of the handle holding case 21 to become a member that supports the handle holding case 21 from below (see FIG. 8 and FIG. 9).

Figure 8:
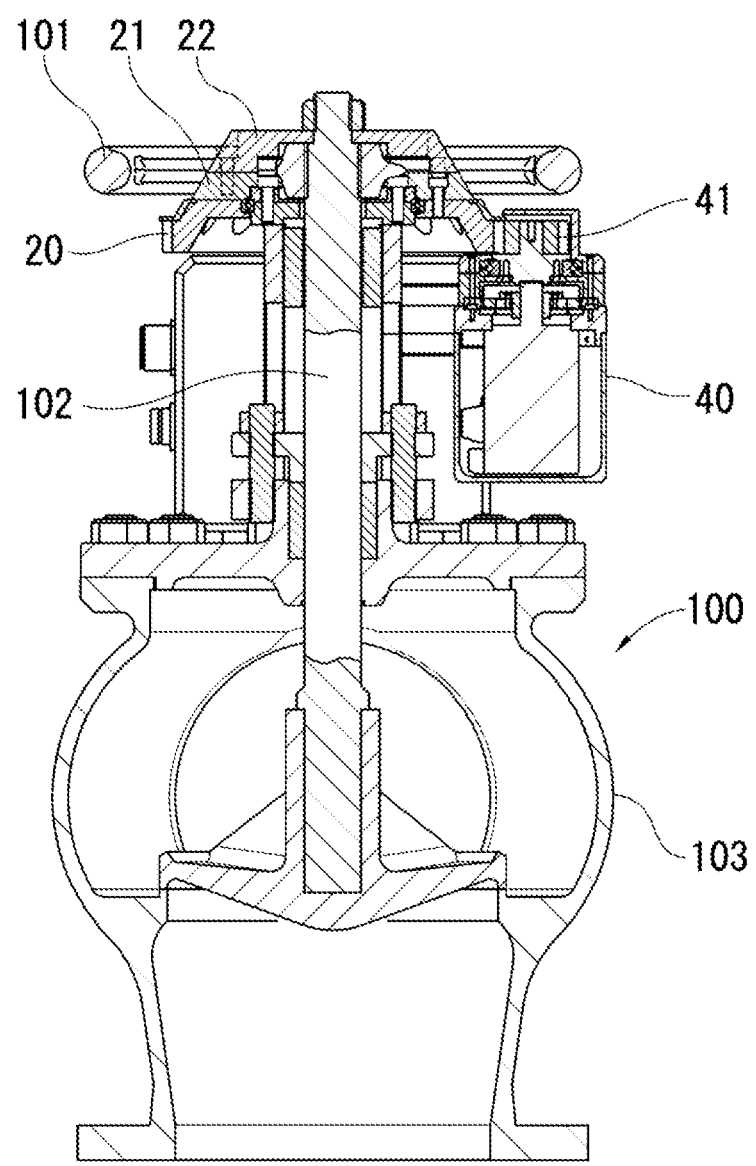
FIG. 8 is a schematic cross-sectional view showing a cross section taken along a diameter direction of the handle and a drive mechanism main body in the structure of the valve shown in FIG. 1.

Further, the bearing portion 31 is arranged between the upper support portion 300 and the lower support portion 301 and the handle rotating gear 20 in the radial direction about the valve rod 102, and as described above, it functions as a bearing for the handle rotating gear 20 (see FIGS. 8 and 9).

Further, the rib attaching portion 32 is a frame-shaped member and is attached to the rib 104 so as to cover the rib 104 from above (see FIGS. 5A to 7B).

Further, rotatable wear preventing rollers 320 are provided at four places on a lower portion side of an inner peripheral surface of the rib attaching portion 32, and the rib attaching portion 32 abuts against an outer peripheral surface of the rib 104 via the wear preventing rollers 320.

That is, the rib attaching portion 32 is attached so as to sandwich the plate-like rib 104 from the outside inside the frame shape.

Figure 7A:
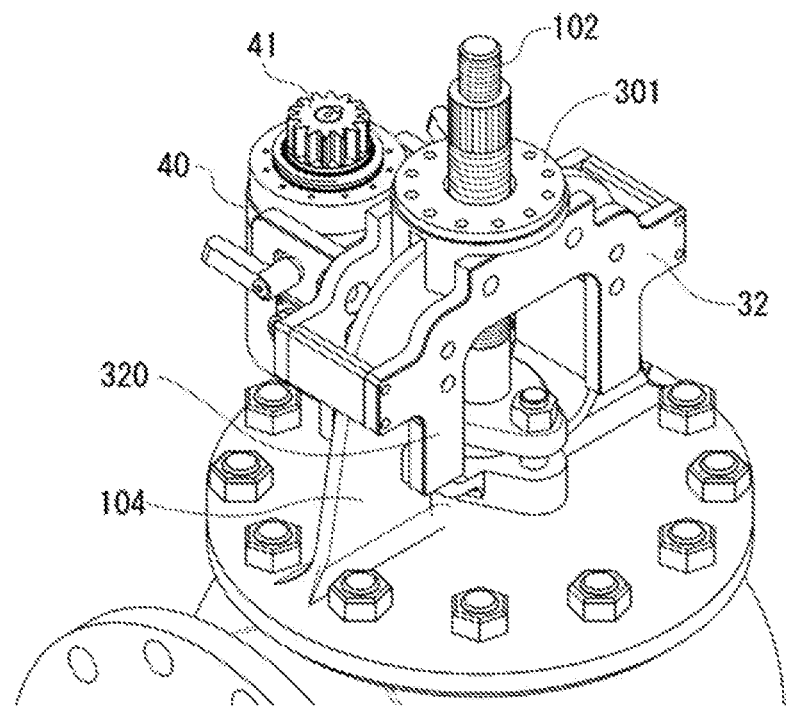
FIGS. 7A and 7B are views showing a state where the rib attaching portion moves in the up-down direction.
Figure 7B:
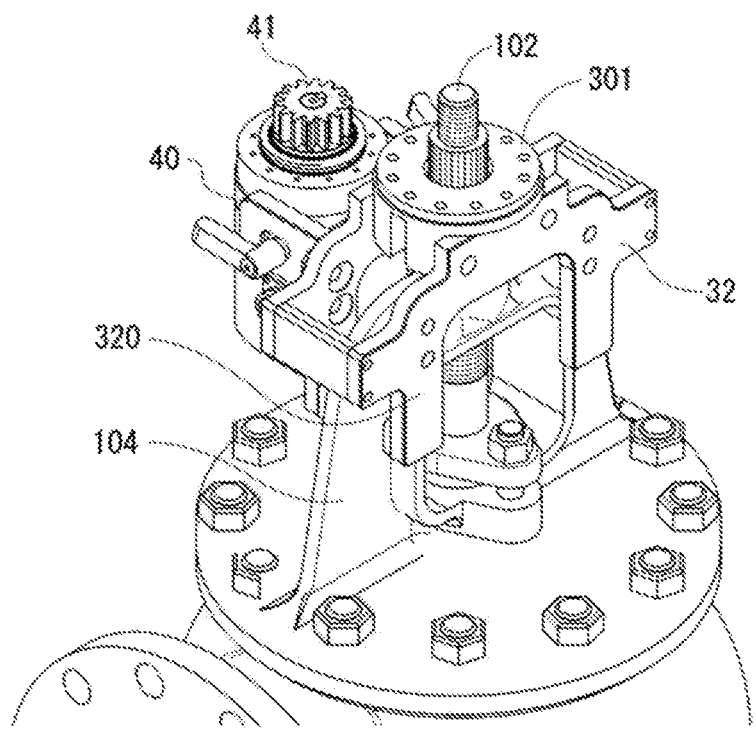

Further, the rib attaching portion 32 is configured to be movable up and down along the rib 104 as the handle 101 and the valve rod 102 rotate and move forward and backward in the up-down direction (see FIGS. 7A and 7B).

At the time of this vertical movement, the wear preventing rollers 320 rotate, which allows for smooth movement of the rib attaching portion 32, and the rib attaching portion 32 can be prevented from coming into contact with the rib 104 and being worn.

Here, the rib attaching portion 32 does not necessarily have to have the structure that abuts against the outer peripheral surface of the rib 104 via the rotatable wear preventing rollers 320. For example, instead of the wear preventing roller 320, a wear preventing portion made of a resin member or the like can be attached to prevent the rib attaching portion 32 from being worn when moving up and down along the rib 104. Further, instead of the wear preventing roller 320, a rotatable ball member can also be used.

Further, as described above, the rib attaching portion 32 is attached to the rib 104 so as to cover the rib 104 from above, so that the rotation around the position of the valve rod 102 is restricted by fitting with the rib 104.

As a result, the rib attaching portion 32 can attach the upper support portion 300 and the lower support portion 301 to the rib 104 so that these members do not rotate.

That is, a structure can be achieved that is supported by the upper support portion 300 and the lower support portion 301 so that the upper support portion 300 and the lower support portion 301 do not rotate but the handle rotating gear 20 can rotate. As a result, the handle rotating gear 20 and the handle 101 can be stably rotated.

Figure 6A:
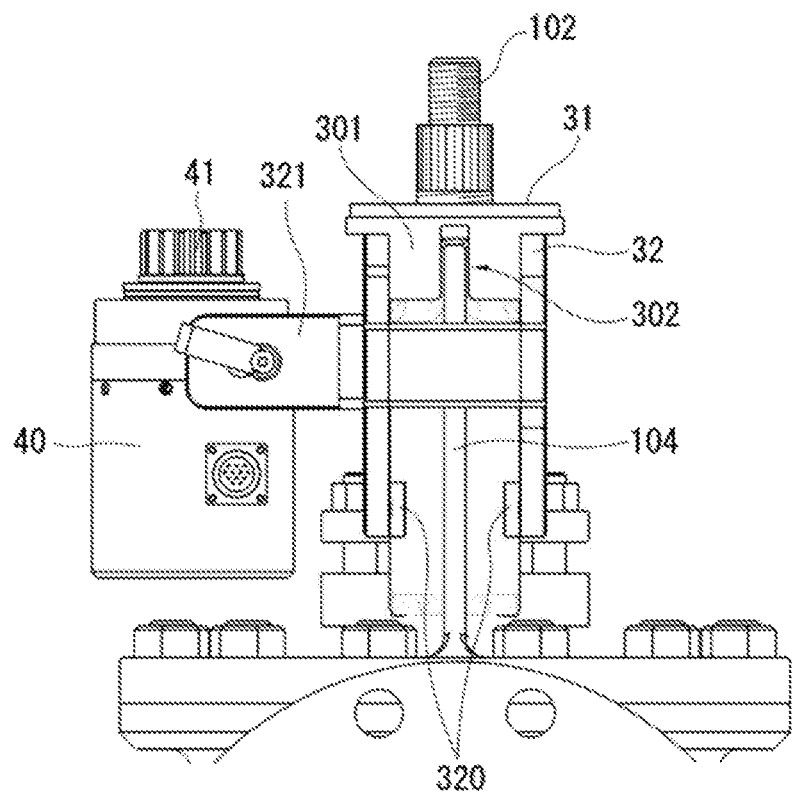
FIG. 6A is a schematic side view of the structure shown in FIG. 5B.

Further, the rib attaching portion 32 has a drive part attaching tool 321 (see FIGS. 5A, 5B, and 6A). The drive part attaching tool 321 is a member for attaching the drive mechanism 4 to the rib attaching portion 32.

[Drive Mechanism]

Figure 6B:
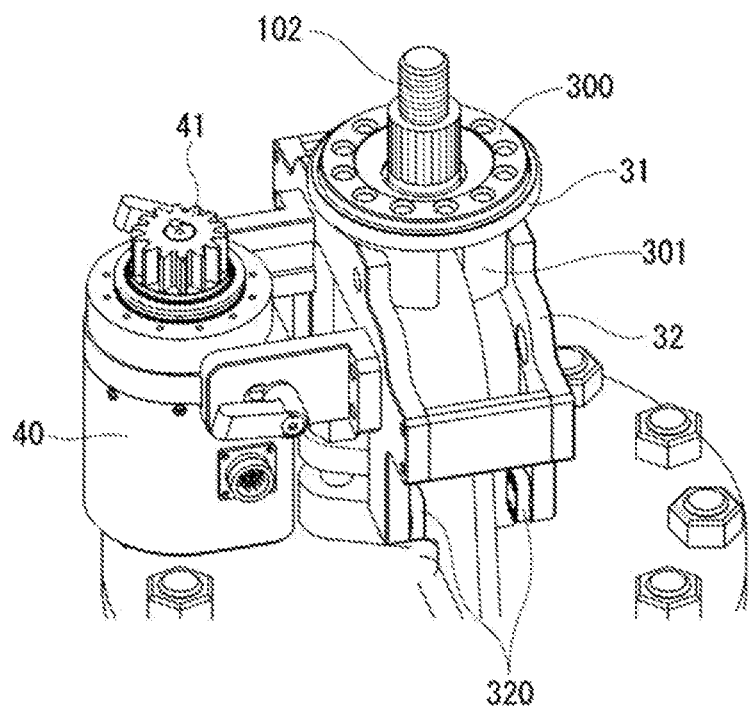
FIG. 6B is a schematic perspective view showing an attaching state of a drive mechanism to the support mechanism.

As shown in FIGS. 6A and 6B, the drive mechanism 4 has a drive part main body 40 and a drive part side gear 41.

Further, the drive part main body 40 has a motor serving as a driving source and a speed reducer connected to the motor to increase the torque of the driving force generated in the motor (illustration omitted). Further, the motor is connected to the control part 5, and via the control part 5, the power is supplied and its drive is controlled.

Further, the drive part side gear 41 is a member that is rotated by the driving force transmitted from the motor and the speed reducer, engages with the handle rotating gear 20, and rotates it (see FIG. 4B).

Further, the drive part side gear 41 is connected to the speed reducer of the drive part main body 40 and is configured to be rotatable by rotational power generated from the motor and increased in torque by the speed reducer. Further, the drive part side gear 41 is arranged above the drive part main body 40, and the height position in the up-down direction is aligned with the height position of the handle rotating gear 20.

As a result, the two gears firmly engage with each other, and the rotation of the drive part side gear 41 is transmitted to the handle rotating gear 20, so that the handle rotating gear 20 and the handle 101 can be rotated (see FIG. 4B).

Further, a cover member 42 covering the drive part side gear 41 from above and having a part of a surface side opposed to the handle rotating gear 20 opened is attached to the drive part side gear 41 (see FIG. 4A).

Further, as described above, the drive part main body 40 is attached to the rib attaching portion 32 via the drive part attaching tool 321. Therefore, the drive part main body 40 and the drive part side gear 41 are restricted in rotation around the position of the valve rod 102 by fitting of the rib attaching portion 32 and the rib 104.

With this, a structure is formed in which the drive part side gear 41 does not rotate around the handle rotating gear 20 along its circumferential direction and the two gears engage with each other at the same position in the circumferential direction of the handle rotating gear 20.

As a result, the rotational power of the drive part side gear 41 can be stably transmitted to the handle rotating gear 20, and the handle 101 can be stably rotated.

Further, the drive part side gear 41 is arranged immediately next to the handle rotating gear 20 in the horizontal direction, so that the loss of the rotational power is small when transmitting the driving force generated in the motor, and the handle rotating gear 20 can be efficiently rotated. Further, a sufficient torque can be generated with respect to the handle 101.

Furthermore, the drive part main body 40 is attached to the rib attaching portion 32 via the drive part attaching tool 321, so that, synchronized with moving of the rib attaching portion 32 in the up-down direction along the rib 104, the drive part main body 40 and the drive part side gear 41 can also move in the up-down direction.

That is, with the height position of the handle rotating gear 20 and the height position of the drive part side gear 41 always aligned in the up-down direction, the handle rotating gear 20 and the drive part side gear 41 can move in the up-down direction together with the movement of the handle 101 and the valve rod 102 rotating and moving forward and backward in the up-down direction.

With this, a structure is formed in which even if the handle 101 rotates and the valve rod 102 moves in the up-down direction, the rotational power can be stably transmitted without the engagement of the two gears, the handle rotating gear 20 and the drive part side gear 41, being misaligned in the up-down direction.

Subsequently, the attachment position of each member of the valve automation mechanism 1 with respect to the valve 100 will be described.

First, the handle rotating gear 20, each member of the support mechanism 3, and each member of the drive mechanism 4 are arranged between the handle 101 and the valve box 103 of the valve 100 in the up-down direction. Thus, the foregoing members for motorizing the handle 101 can be attached without changing the original overall height of the valve 100.

Further, the case lid portion 22 is also arranged between the fixing nut 105 and the handle 101, so that it can be attached to the handle 101 without affecting the overall height of the valve 100 (see FIGS. 8 and 9).

As just described, the valve automation mechanism 1 to which the present invention is applied can motorize a target valve without increasing the size of the valve in the height direction and can achieve a compact structure.

Further, each member of the gear attaching mechanism 2, each member of the support mechanism 3, and the drive part side gear 41 are arranged within the range of an outer circumferential edge of the handle 101 of the valve 100 in the horizontal direction. Thus, the foregoing members for motorizing the handle 101 can be accommodated in a space further inward than the handle 101 in the horizontal direction.

Further, in the horizontal direction, the drive part main body 40 also has its end portion located slightly further outward than an outer edge portion of the handle 101 but the drive part main body 40 is located further inward than the outermost edge portion of the valve box 103, so that a target valve can be motorized without increasing the size of the valve in the horizontal direction and a compact structure can be achieved (see FIG. 8).

Although the control part 5 has a structure that is arranged above a flange portion of the valve 100 for convenience, it is sufficient if electric power supply and transmission of control signals with respect to the motor are possible. Therefore, the length of wiring connected to the motor can be extended to arrange the control part 5 at a position away from the valve 100.

[Outer Circumferential Diameter and Number of Gear Teeth of Handle Rotating Gear]

Next, the relationship between the outer circumferential diameter and the number of gear teeth of the handle rotating gear 20 and the handle 101 will be described. As described above, on the outer circumferential surface of the handle rotating gear 20, the teeth the number of which is formed in accordance with the size of the outer circumferential diameter of the handle 101 are formed. Further, the size of the outer circumferential diameter of the handle rotating gear 20 is formed in accordance with the size of the outer circumferential diameter of the handle 101.

Here, in general, as the diameter of the valve (diameter of the connected pipe) increases, the outer circumferential diameter of the handle attached to the valve is configured to increase as well.

Thus, in the valve automation mechanism 1 of the present invention, a handle rotating gear 20 whose outer circumferential diameter and number of gear teeth have been changed according to the outer circumferential diameter of the handle of the valve, which is an object to be attached, is prepared and replaced, which makes it possible to accommodate valves having different diameter sizes while using the same drive mechanism 4.

Hereinafter, the relationship between valves having different diameter sizes and the outer circumferential diameter and the number of gear teeth of handle rotating gears having been set according to the valves will be shown in Table 1. Table 1 shows the relationship among the diameter of the valve, the outer circumferential diameter of Handle, the outer circumferential diameter and the number of gear teeth of the handle rotating gear, the maximum rotational torque and the maximum number of rotations of the valve when the drive mechanism 4 has a maximum rotational torque of 100 N·m and the number of gear teeth of the drive part side gear 41 is 12.

TABLE 1

| | | | |
|---|---|---|---|
| Diameter of Valve (mm) | 100 | 200 | 300 |
| Outer Circumferential Diameter of Handle (mm) | 300 | 500 | 700 |
| Outer Circumferential Diameter (mm), Number of Gear Teeth (piece) of Handle Rotating Gear | 200, 36 | 400, 60 | 600, 84 |
| Speed Reduction Ratio | 1:3 | 1:5 | 1:7 |
| Maximum Rotational Torque (N · m) | 300 | 500 | 700 |
| Maximum Number of Rotations (rpm) | 33 | 20 | 14 |

As shown in this Table 1, the maximum rotational torque of the valve can be changed while using the drive mechanism 4 having a maximum rotational torque of 100 N·m and the number of gear teeth of the drive mechanism side gear of 12, by changing the size of the outer circumferential diameter and the number of gear teeth of the handle rotating gear according to the size of the outer circumferential diameter of the handle of the valve. That is, even a valve having a large diameter can obtain a maximum torque sufficient for opening and closing the valve.

Further, in the valve having a large diameter, the rotational torque increases while the maximum number of rotations is reduced. However, the larger the diameter, the smaller the required maximum number of rotations. Thus, the specifications of Table 1 can accommodate three types of valves having different diameters.

The content and conditions shown in Table 1 are merely examples, and the specifications of the handle rotating gear 20 and the drive mechanism 4 can be changed as appropriate in the valve automation mechanism to which the present invention is applied.

Hereinafter, a step of attaching the valve automation mechanism 1 to the valve 100 will be briefly described.

First, the fixing nut 105 is removed and the handle 101 is removed from the valve rod 102 in the valve 100 already provided in a piping facility or the like.

Next, the rib attaching portion 32 is attached so as to cover the rib 104 from above and the rib 104 and the rib attaching portion 32 are fitted. Further, the drive part main body 40 and the drive part side gear 41 are attached to the rib attaching portion 32 via the drive part attaching tool 321 and integrated.

Further, the upper support portion 300 and the lower support portion 301 are attached while the valve rod 102 is inserted from above the rib attaching portion 32, and the lower support portion 301 and the rib attaching portion 32 are fixed with a bolt.

Furthermore, an integrated object of the handle holding case 21 and the handle rotating gear 20 is attached to an upper portion of the upper support portion 300 while the valve rod 102 is inserted from above the upper support portion 300.

Subsequently, the spokes of the handle 101 are aligned with the groove portion 210 of the handle holding case 21, and the handle 101 is placed on the handle holding case 21.

Then, the groove portion 220 of the case lid portion 22 are aligned with the spokes of the handle 101, and the handle 101 is covered with the case lid portion 22. Further, the fixing nut 105 is tightened on the upper portion of the valve rod 102 protruding from a hole portion in the center of the case lid portion 22, and the handle 101, the case lid portion 22, the handle holding case 21, and the handle rotating gear 20 are integrated and fixed.

Then, by connecting the drive part main body 40 and the control part 5 with wiring, the attachment of the valve automation mechanism 1 to the valve 100 is completed.

As described above, the valve automation mechanism 1 can be attached to the existing valve 100 to motorize the valve 100 with a very simple operation. Further, when the valve automation mechanism 1 is removed from the valve 100, the valve automation mechanism 1 can be easily and quickly removed in a reverse procedure to the above.

Further, as described above, by replacing the handle rotating gear to be used according to the size of the diameter of the valve, which is an object to be attached, in the valve automation mechanism of the present invention, it can be applied to valves having a plurality of diameter sizes.

As described above, the valve automation mechanism according to the present invention can be easily attached to a large manual valve, can motorize the valve, and is sufficiently downsized so as to be placeable in a narrow installation space.

Further, the valve automation method according to the present invention is a method capable of providing a valve automation mechanism that can be easily attached to a large manual valve, can motorize the valve, and is sufficiently downsized so as to be placeable in a narrow installation space.

REFERENCE SIGNS LIST

1 Valve automation mechanism
2 Gear attaching mechanism
20 Handle rotating gear
21 Handle holding case
210 Groove portion
22 Case lid portion
220 Groove portion
3 Support mechanism
30 Gear supporting portion
300 Upper support portion
301 Lower support portion
302 Fitting groove
31 Bearing portion
32 Rib attaching portion
320 Wear preventing roller
321 Drive part attaching tool
4 Drive mechanism
40 Drive part main body
41 Drive part side gear
42 Cover member
5 Control part
100 Valve
101 Handle
102 Valve rod
103 Valve box
104 Rib
105 Fixing nut

The invention claimed is:

1. A valve automation mechanism that is attached to a predetermined valve having a valve box, which is attached to a valve rod and a handle, and controls a flow of a fluid inside the valve box by rotating the handle and moving the handle and the valve rod forward and backward along a longitudinal direction of the valve rod, and is capable of automatically rotating the handle, the valve automation mechanism comprising:
a handle holding portion attached to the handle;
a handle rotating gear located between the valve box and the handle in the longitudinal direction of the valve rod, attached to the handle holding portion, and configured to rotate integrally with the handle;
a gear supporting portion comprising:
a substantially tubular body that is substantially parallel to a plane defined by the handle and is located between the valve rod and the handle rotating gear and
a through hole into which the valve rod is inserted;
a valve attaching portion located between the valve box and the handle in the longitudinal direction of the valve rod, connected to the gear supporting portion, and attached to the predetermined valve such that rotation around a position of the valve rod is restricted;
a drive mechanism located between the valve box and the handle in the longitudinal direction of the valve rod, attached to the valve attaching portion, and having a motor and a speed reducer; and
a drive mechanism gear attached to the speed reducer, configured to be rotatable by a driving force of the motor, and transmitting power by engagement of the handle rotating gear and the drive mechanism gear.

2. The valve automation mechanism according to claim 1, wherein the handle holding portion, the handle rotating gear, the gear supporting portion, the valve attaching portion, and the drive mechanism gear are bounded within an outer edge of the handle when viewed from a direction perpendicular to the plane defined by the handle.

3. The valve automation mechanism according to claim 1, wherein the predetermined valve has a rib portion communicably connected to the valve box in a manner so as to project toward a direction of the handle and fitted to the valve rod by a thread groove structure for supporting rotation of the valve rod and forward and backward movement of the valve rod along the longitudinal direction thereof, and
the valve attaching portion is attached to the rib portion so as to sandwich the rib portion and is configured to be able to move forward and backward along the rib portion along with forward and backward movement of the handle and the valve rod along the longitudinal direction of the valve rod.

4. The valve automation mechanism according to claim 3, wherein the valve attaching portion has a wear preventing mechanism configured to be rotatable, on at least a part of a surface opposed to the rib portion.

5. The valve automation mechanism according to claim 3, wherein the valve attaching portion is arranged with a wear preventing member for preventing wear between the valve attaching portion and the rib portion, on at least a part of the surface opposed to the rib portion.

6. The valve automation mechanism according to claim 1, wherein the handle rotating gear and the drive mechanism gear are arranged in an orientation substantially parallel to the plane defined by the handle.

7. The valve automation mechanism according to claim 1, further comprising a bearing portion attached between the gear supporting portion and the handle rotating gear to smooth rotation of the handle rotating gear.

8. The valve automation mechanism according to claim 7, wherein the bearing portion is composed of a crossed roller bearing.

9. The valve automation mechanism according to claim 1, wherein an outer circumferential diameter and the number of gear teeth of the handle rotating gear can be changed according to the size of an outer circumferential diameter of the handle.

10. The valve automation mechanism according to claim 1, wherein the predetermined valve is an existing manual valve in which the handle is rotated manually, and
the handle holding portion, the handle rotating gear, the gear supporting portion, the valve attaching portion, the drive mechanism, and the drive mechanism gear can be retrofitted to the existing manual valve.

11. A valve automation method for automatically rotating a handle of a predetermined valve that has a valve box, which is attached to a valve rod and the handle, and controls a flow of a fluid inside the valve box by rotating the handle and moving the handle and valve rod forward and backward along a longitudinal direction of the valve rod, the method comprising:
an attaching step of attaching, between the valve box and the handle in the longitudinal direction of the valve rod:

a handle rotating gear rotating integrally with the handle;

a gear supporting portion for supporting the handle rotating gear;

a valve attaching portion connected to the gear supporting portion on one side, attached to the predetermined valve on another side, and restricted in rotation around a position of the valve rod;

a drive mechanism attached to the valve attaching portion and having a motor and a speed reducer; and a drive mechanism gear rotated by a driving force of the motor and transmitting power by engagement of the handle rotating gear and the drive mechanism gear; and a handle rotating step of driving the motor, rotating the drive mechanism gear, and rotating the handle.

12. The valve automation method according to claim 11, wherein the attaching step attaches the handle rotating gear, the gear supporting portion, the valve attaching portion, and the drive mechanism gear within a boundary defined by an outer edge of the handle when viewed in a direction substantially perpendicular to the handle.

13. The valve automation method according to claim 11, wherein the predetermined valve has a rib portion communicably connected to the valve box in a manner so as to project toward a direction of the handle and fitted to the valve rod by a thread groove structure for supporting rotation of the valve rod and forward and backward movement of the valve rod along the longitudinal direction thereof, and the attaching step attaches the valve attaching portion to the rib portion so as to sandwich the rib portion, and the handle rotating step moves the valve attaching portion along the rib portion forward and backward along with forward and backward movement of the handle and the valve rod along the longitudinal direction of the valve rod.

14. A valve automation mechanism that is attached to a predetermined valve having a valve box, which is attached to a valve rod and a handle, controls a flow of a fluid inside the valve box by rotating the handle and moving the handle and the valve rod forward and backward along a longitudinal direction of the valve rod, and is capable of automatically rotating the handle, the valve automation mechanism comprising:

a handle rotating gear arranged between the valve box and the handle in the longitudinal direction of the valve rod and rotating integrally with the handle;

a holding mechanism arranged between the valve box and the handle in the longitudinal direction of the valve rod, supporting the handle rotating gear, attached to the predetermined valve, and restricted in rotation around a position of the valve rod; and a gear drive mechanism arranged between the valve box and the handle in the longitudinal direction of the valve rod, attached to the holding mechanism, rotated based on a driving force of a motor, and transmitting power by engagement of the handle rotating gear and the drive mechanism gear.

* * * * *